United States Patent [19]

Zecher

[11] 4,379,883

[45] Apr. 12, 1983

[54] CHEMICALLY-INITIATED INVERSE EMULSION POLYMERIZATION WITH Na, LI/Cl, Br SALT

[75] Inventor: David C. Zecher, Frederick, Md.

[73] Assignee: Hercules Incorporated, Wilmington, Del.

[21] Appl. No.: 289,847

[22] Filed: Aug. 4, 1981

Related U.S. Application Data

[63] Continuation of Ser. No. 106,214, Dec. 21, 1979, abandoned.

[51] Int. Cl.$^3$ .................................................. C08F 2/32
[52] U.S. Cl. .................................... 524/801; 523/336; 524/779; 526/237; 526/238
[58] Field of Search ............... 524/801, 779; 523/336; 526/237, 238

[56] References Cited

U.S. PATENT DOCUMENTS

| | | | |
|---|---|---|---|
| 3,215,680 | 11/1965 | Koloda | 260/89.7 |
| 3,284,393 | 11/1966 | Vanderhoff et al. | 260/29.6 |
| 3,405,106 | 10/1968 | Scanley | 260/80 |
| 3,493,500 | 2/1970 | Volk et al. | 210/54 |
| 3,509,114 | 4/1970 | Ballast | 260/80 |
| 3,826,771 | 7/1974 | Anderson et al. | 260/29.6 H |
| 3,919,140 | 11/1975 | Hirata et al. | 260/17 A |
| 4,024,040 | 5/1977 | Phalangas | 204/159.22 |
| 4,242,247 | 12/1980 | Pellon et al. | 260/29.6 WQ |

*Primary Examiner*—Harold D. Anderson
*Attorney, Agent, or Firm*—H. L. Deming

[57] ABSTRACT

A chemically initiated water-in-oil emulsion polymerization process is disclosed for making water-soluble anionic copolymers from water-soluble, ethylenically unsaturated, addition polymerizable monomers. Improved products are obtained by adding a water-soluble salt to the aqueous phase of the water-in-oil emulsion prior to polymerization.

10 Claims, No Drawings

CHEMICALLY-INITIATED INVERSE EMULSION POLYMERIZATION WITH NA, LI/CL, BR SALT

This is a continuation of application Ser. No. 106,214, filed Dec. 21, 1979 abandoned.

This invention is directed to improvements in a process for preparing water-in-oil emulsions of water-soluble, anionic vinyl addition polymers, which emulsions comprise an aqueous phase containing the water-soluble, anionic vinyl addition polymer, an inert hydrophobic liquid, and a water-in-oil emulsifying agent.

A prior art technique for preparing water-in-oil emulsions is disclosed in U.S. Pat. No. 3,284,393 to Vanderhoff et al. Vanderhoff's process involves dissolving a water-in-oil emulsifying agent in an inert hydrophobic liquid (i.e., the oil phase), dissolving a water-soluble vinyl addition monomer in water (i.e., the aqueous phase), and dissolving a free radical initiator in either the oil phase or aqueous phase, depending upon the solubility of the particular initiator used. The aqueous phase is then added to the oil phase with agitation until the aqueous phase is emulsified in the oil phase. The polymerization is then carried out at temperatures between 40° C. and 70° C. and the product recovered.

Several improvements over the Vanderhoff et al process are described in the prior art. For example, U.S. Pat. No. 3,826,771 to Anderson et al. discloses water-in-oil emulsions containing 75–95% aqueous phase (compared to Vanderhoff's 30–70% aqueous phase). These emulsions are purported to be more stable than those prepared by Vanderhoff.

Solution polymerization of water-soluble, ethylenically unsaturated monomers to form high molecular weight, water-soluble polymers is also disclosed in the prior art. The use of salt in such solution polymerizations is disclosed in U.S. Pat. No. 3,493,500 to Volk et al. Volk et al disclose the chemically initiated polymerization of water-soluble monomers in an aqueous solution containing salt, the salt serving to induce precipitation of the polymerized product. U.S. Pat. No. 3,405,106 to Scanley and U.S. Pat. No. 3,509,114 to Ballast disclose the use of salt in the chemically initiated polymerization of water-soluble monomers to accelerate polymerization rates. Likewise, solution polymerization of water-soluble monomers in the presence of salt via high energy radiation is disclosed in U.S. Pat. No. 4,024,040 to Phalangas et al.

In accordance with this invention, it has been found that very high molecular weight water-soluble, anionic polymers can be prepared by emulsion polymerization by adding to the emulsion prior to polymerization from about 2% by weight of salt based on the total weight of the emulsion to the saturation point of the salt in the aqueous phase of the emulsion at the polymerization temperature. A preferred embodiment of the process of this invention comprises:

(a) preparing an aqueous phase comprising at least two water-soluble, ethylenically unsaturated, addition polymerizable monomers, at least one of which is anionic, and a water-soluble salt dissolved in water;

(b) preparing an oil phase comprising an inert hydrophobic liquid and a water-in-oil emulsifying agent dissolved therein;

(c) dissolving a chemical free radical initiator in either the aqueous phase or the oil phase, depending upon the solubility characteristics of the initiator;

(d) dispersing the aqueous phase into the oil phase to form an emulsion; and (e) polymerizing the water-soluble monomers.

It should be noted that there are many variations of the above procedure that may be utilized. For example, the chemical free radical initiator can be added after the aqueous and oil phases are emulsified. Likewise, an emulsion of the monomer may be formed and fed incrementally or continuously to a "heel" of the emulsion in the reactor.

Regardless of the particular procedure employed, it is essential that the aqueous phase be properly dispersed into the oil phase. The molecular weight of the product polymer increases significantly with decreasing size of the aqueous phase droplets which are dispersed in the oil phase. According to this invention, the size of the dispersed aqueous phase droplets is about 5 microns or less, preferably about 1 micron or less. Droplet sizes of 5 microns or less may be achieved by any suitable method, including agitation of the aqueous phase/oil phase mixture in a high speed blender or homogenizer, or passing said mixture through a colloid mill at a small gap setting.

The water-soluble monomers that can be employed in the process of this invention include water-soluble, ethylenically unsaturated monomers conforming to the formula

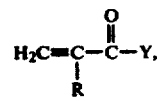

vinyl sulfonic acid, alkali metal salts of vinyl sulfonic acid, diacetone acrylamide, and mixtures thereof. In the above formula R represents hydrogen or methyl and Y represents $-NH_2$, $-OH$, or

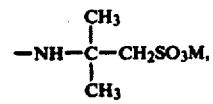

wherein M is hydrogen, $H_4N^+$, alkali metal, or any other cation yielding a water-soluble, polymerizable compound. At least one of the monomers used to produce the water-soluble, anionic polymers must have anionic functionality, i.e., where vinyl sulfonic acid or its alkali metal salts are used or where Y in the above formula is OM or

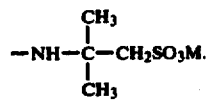

Illustrative examples of monomers conforming to the above formula include acrylamide, methacrylamide, 2-acrylamido-2-methyl-propanesulfonic acid, acrylic and methacrylic acids and their water-soluble salts, such as their ammonium and alkali metal salts. A preferred nitrogen-bearing monomer within the above formula is acrylamide, and a preferred anionic monomer is sodium acrylate. The invention contemplates polymers obtained by polymerizing mixtures of the above defined monomers as well as water-soluble mixtures of such monomers with up to 10% by weight of other water-soluble, copolymerizable, ethylenically unsaturated monomers, such as, for example, vinylimidazole, acrylonitrile, and maleic acid and water-soluble salts of maleic acid, such as the alkali metal salts of maleic acid.

The monomer combinations described above produce polymers which are anionic. When used in this specification, the expression "anionic polymer" means polymer consisting of 1% to 99% by weight of polymerized anionic monomer and 99 to 1% by weight of polymerized nonionic monomer based on the total polymerized monomer weight. Preferably, the anionic monomer comprises from about 10% to about 50% by weight based on the total weight of all monomers. By way of illustration, copolymers of acrylamide with acrylic acid or its salts are anionic.

The above-described monomers and water comprise the aqueous phase of the water-in-oil emulsion. The monomers may be used in amounts from about 10% to about 30%, preferably from about 20% to about 30%, by weight based on the weight of the emulsion.

The aqueous phase also contains water-soluble salt dissolved therein. It has been found that the addition of salt to the emulsion prior to polymerization leads to several beneficial effects. Polymerization rates are accelerated, thereby shortening the time required for substantially complete conversion of monomer to polymer. Coupled with this polymerization rate effect, is the added benefit that conversions of monomer to polymer in excess of about 90%, and in particular in excess of about 95%, are achieved using less chemical initiator when salt is present in the emulsion than when salt is not present. In addition, significant increases in the molecular weight of the water-soluble polymers produced are observed when salt is present in the emulsions prior to polymerization. Throughout this specification reduced specific viscosity (RSV) is used as a measure of the molecular weight of the water-soluble polymers in the emulsions. Thus, typical RSV's for water-soluble sodium acrylate/acrylamide copolymers prepared by emulsion polymerization in the presence of salt at a polymerization temperature of about 50° C. are in the range of about 27-31 while water-soluble sodium acrylate/acrylamide copolymers prepared by the same process but in the absence of salt have RSV's of only about 22-24.

Another benefit of the presence of salt is a dramatic effect upon the appearance of the emulsions produced. Emulsions having no salt are milky, while those which do contain salt are translucent; some approaching transparent.

The amount of salt used will depend upon the particular salt, its solubility characteristics and the polymerization conditions. In general, however, the amount of salt employed is from about 2%, based on the total weight of the total emulsion, to the saturation point of the salt in the aqueous phase at the polymerization temperature, and preferably from about half saturation to saturation.

The water-soluble salts which may be used in the process of this invention are those water-soluble salts which are sufficiently soluble in the aqueous phase to furnish a solution containing at least 2% by weight of dissolved salt, based on the total weight of the emulsion, and which are incapable of forming free radical scavengers. Salts which are useful in the process of this invention include sodium chloride, sodium bromide, lithium chloride and lithium bromide. The preferred salt is sodium chloride. Salts such as sodium sulfate and potassium chloride are not effective in improving the RSV of the water-soluble, anionic polymers produced in accordance with this invention.

The oil phase of the emulsion comprises an inert hydrophobic liquid and a water-in-oil type emulsifying agent. Any inert hydrophobic liquid may be used including, for example, aliphatic and aromatic hydrocarbons and halocarbons such as toluene, xylene, o-dichlorobenzene, perchloroethylene, hexane, heptane, kerosene, mineral oil, and Isopar M, a high-purity isoparaffinic material sold by Exxon Corp. The preferred inert hydrophobic liquid is Isopar M. Likewise, any conventional water-in-oil emulsifying agent can be used, such as hexadecyl sodium phthalate, sorbitan monooleate, sorbitan monostearate, mono- and diglycerides, polyethoxylated sorbitol hexaoleate, cetyl or stearyl sodium phthalate, metal soaps or combinations thereof. Generally, the emulsifying agents used in the oil phase have a low hydrophile-lyophile balance, e.g., about 3 to 5. Preferred emulsifying agents are sorbitan monooleate and a blend of polyethoxylated sorbitol hexaoleate and mono- and diglycerides. These emulsifying agents constitute about 0.5% to about 10%, preferably about 1% to about 5%, by weight of the emulsion.

The ratio of the aqueous phase to oil phase can vary widely. Generally, the water-in-oil emulsions will comprise about 20% to about 80% by weight of aqueous phase and about 80% to about 20% by weight of oil phase based on the total weight of the water-in-oil emulsion. A preferred aqueous phase to oil phase ratio is about 70-75% by weight aqueous phase to about 30-25% by weight oil phase based on the weight of the water-in-oil emulsion.

As previously stated, the polymerization is initiated by means of a chemical free-radical initiator. The initiator may dissolve in either the oil phase or the aqueous phase, depending upon its solubility characteristics. Examples of water-soluble initiators include 4,4'-azobis-4-cyanovaleric acid (ACVA) having the formula:

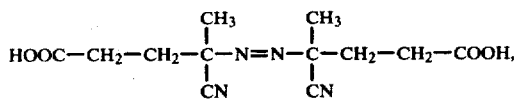

potassium persulfate ($K_2S_2O_8$), and t-butyl hydroperoxide. Examples of oil-soluble initiators include azobisisobutyronitrile (AIBN) having the formula:

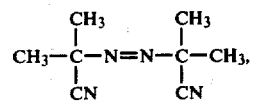

2,2'-azobis(2,4-dimethylvaleronitrile) (ADVN) having the formula:

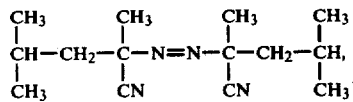

and benzoyl peroxide. In addition, water-soluble redox-type initiators can be used such as, for example bromate/bisulfite or metabisulfite (e.g., $KBrO_3/NaHSO_3$ or $KBrO_3/Na_2S_2O_5$), persulfate/bisulfite (e.g., $K_2S_2O_8/$ NaHSO$_3$), and bisulfite/t-butyl hydroperoxide (e.g., NaHSO$_3$/t-butyl hydroperoxide).

The amount of chemical initiator utilized depends upon several factors. As a general rule, the rate of reaction is directly proportional to the reaction temperature, i.e., as the reaction temperature is decreased the rate of reaction slows due to a decrease in the activity of the initiator. Thus, if a desired reaction rate is to be maintained, the amount of initiator must be increased as the reaction temperature is lowered. This is particularly important in view of the advantages achieved by polymerizing at lower temperatures, as indicated hereinafter. By adjusting the reaction temperature and initiator level, the polymerization can be accomplished in a reasonable time and at reasonable percent conversion of monomer to polymer (e.g., at least about 95%) while maintaining the advantages of lower polymerization temperatures.

Thus, while the concentration of the initiator may vary, it will generally be used in amounts from about 0.1 to about 10,000 parts per million (ppm) based on the weight of the monomers, preferably from about 0.1 to about 1,000 ppm when a redox type initiator is used and preferably from about 1.0 to about 10,000 ppm when a thermal type initiator, e.g., ACVA, ADVN, or AIBN, is used.

As previously stated, certain advantages can be achieved by polymerizing at relatively low temperatures, i.e., below about 40° C., preferably from about 40° C. to about 0° C., from about 30° C. to about 10° C. being particularly preferred. Polymer RSV significantly increases when the polymerization is conducted in accordance with the process of this invention at, for example, 20° C. versus 50° C. Thus, typical RSV values of the water-soluble polymers produced in accordance with this invention at a polymerization temperature of about 50° C. are about 27–31. However, following the same procedure, water-soluble polymers are produced at a polymerization temperature of about 40° C. having RSV's of about 32–35, and, at 20° C., of about 38–40.

These low reaction temperatures may be achieved in any convenient manner, as by immersing the reaction vessel in a constant temperature bath, surrounding the reaction vessel with cooling coils, and the like. It should be noted that the polymerization is an exothermic reaction and, therefore, the temperature of the reaction mixture may vary slightly during the course of the polymerization if not run under isothermal conditions. A typical reaction time versus reaction mixture temperature profile for a polymerization conducted as described in the examples which follow at a bath temperature of about 30° C. is shown in Table A below. The initial temperature of 22° C. is maintained prior to initiation of the reaction to prevent premature polymerization.

TABLE A

| Reaction time (minutes) | Temp., °C. | Reaction time (minutes) | Temp., °C. |
|---|---|---|---|
| 0 | 22.0 | 52 | 33.0 |
| 7 | 31.0 | 60 | 32.1 |
| 15 | 36.0 | 90 | 31.0 |
| 25 | 38.9 | 110 | 30.6 |
| 35 | 34.5 | 300 | 30.0 |

The best mode contemplated of carrying out the process of this invention is illustrated by the following examples. In the following examples and throughout this specification, all percentages and parts are by weight unless otherwise indicated.

Conversion of monomer to polymer is indicated in the examples. This conversion is measured by adding to a sample of the emulsion produced a known volume of an acidified bromate-bromide solution which brominates any monomer in the emulsion. Iodometric titration is then used to determine the excess bromine present in the emulsion so that the amount of monomer can be calculated.

A typical bromination/iodometric conversion determination procedure comprises preparing a 1% emulsion solution by adding 1.5 g. of the emulsion produced to 148.5 g. of water which contains 0.2 g. of Renex 20, a nonionic inverting surfactant sold by ICI Americas Inc. The resulting mixture is tumbled overnight to assure complete dissolution. A 50.0 g. aliquot of the 1% emulsion solution is then weighed in an iodine flask and 25 ml. of a 0.1 N KBr-KBrO$_3$ aqueous solution is added to the flask followed by 15 ml. of 10% H$_2$SO$_4$ and the flask is quickly stoppered. Into the gutter of the flask is placed 10 ml. of a 10% KI aqueous solution and the flask is placed in the dark for 30 minutes. 20 ml. of the 10% KI solution is then added to the flask by pouring it through the gutter and slowly removing the stopper so that no Br$_2$ gas is lost. The resulting mixture is then titrated with a 0.1 N aqueous Na$_2$S$_2$O$_3$ solution. The same procedure is carried out on a blank 1% emulsion solution which contains all of the ingredients as the emulsion being tested except for monomer or polymer. The conversion of monomer to polymer can then be calculated using the following formula:

$$\text{Conversion} = 100 - \frac{N(V_B - V_S)}{0.2 \times A \times B \times D}$$

where

N = normality of the Na$_2$S$_2$O$_3$ solution $V_B$ = volume in ml. of Na$_2$S$_2$O$_3$ solution for titration of the blank $V_S$ = volume in ml. of the Na$_2$S$_2$O$_3$ solution for titration of the sample.

A = weight of total monomers per gram of original emulsion

B = moles of total monomers per gram of total monomers

D = weight of the 1% emulsion solution sample in grams

RSV of the polymers produced is also indicated in the examples. RSV is measured by diluting a portion of the 1% emulsion solution prepared for the measurement of conversion of monomer to polymer with 2 m. NaCl to give a 0.025 g/dl polymer solution, based on the calculated percent conversion of monomer to polymer. Thus, for an emulsion which originally contains 25% by weight monomer based on the weight of the emulsion and which, after polymerization, has a 96% conversion of monomer to polymer, the weight of the 1% emulsion solution to be used in preparing a 0.025 g/dl solution in 2 m. NaCl would be calculated as follows:

$$\text{weight} = \frac{0.025 \times 10^6}{1 \times E \times F} = \frac{25,000}{25 \times 96} = 10.42 \text{ g.}$$

where

E = percent monomer concentration in the original emulsion

F = percent conversion from monomer to polymer.
The 10.42 g. of the 1% emulsion solution is then diluted to 50.0 g. with deionized water and 57.1 g. of 19.6% NaCl solution added to produce the 0.025 g/dl polymer solution.

RSV is measured using an Ubbelohde viscometer in a 30° C. constant temperature bath. The viscometer is filled with 2 m. NaCl solution until the level of the solution is between the high and low level lines on the lower bulb. The solution is allowed to reach the bath temperature (30° C.). The solution is then pulled up the viscosity tube using the suction bulb until is is above the line between the two upper bulbs. The time in seconds that it takes the solution to drop from the upper to the lower graduation lines at the measuring bulb is recorded and this procedure is repeated until two consecutive runs agree with ±0.5% of each other, the average of these two runs being used in subsequent calculations.

The viscometer is then emptied and rinsed thoroughly with the 0.025 g/dl polymer solution. The procedure described above for the 2 m. NaCl solution is repeated using the 0.025 g/dl polymer solution. RSV can then be calculated according to the following formula:

$$RSV = \frac{\dfrac{t_s - \dfrac{K}{t_s}}{t_o - \dfrac{K}{t_o}} - 1}{C}$$

where
  $t_s$ = flow time for the 0.025 g/dl polymer solution
  $t_o$ = flow time for the 2 m. NaCl solution.
  K = viscometer kinetic energy correction
  C = polymer concentration in g./100 ml, in this case 0.025.

EXAMPLE 1

This example illustrates the preparation of a water-in-oil emulsion containing a water-soluble sodium acrylate/acrylamide copolymer.

The aqueous phase is prepared by combining the following:

| | |
|---|---|
| 176.6 g. | of a 49.55 wt % aqueous solution of acrylamide (87.5 g. acrylamide) |
| 110.3 g. | of a 34.0 wt % aqueous solution of sodium acrylate (37.5 g. sodium acrylate) |
| 0.25 g. | of 1 wt % aqueous solution of Versenex 80 heavy metal chelating agent which is the sodium salt of diethylenetriamine pentaacetic acid (sold by Dow Chemical Co.) |
| 40.0 g. | NaCl |
| 5.0 g. | of a 1 wt % aqueous solution of ACVA (400 ppm. ACVA, based on the weight of the monomers) |
| 25.85 g. | water |
| 358.0 g. | total |

The oil phase is prepared by combining 129.5 g. Isopar M with 12.5 g. of a water-in-oil emulsifying agent (mixture of mono- and diglycerides and polyethoxylated sorbitol hexaoleate), making the total weight of the oil phase 142.0 grams.

The aqueous phase and oil phase are combined and the resultant mixture is homogenized for 2 minutes in a Waring blender at high speed forming a water-in-oil emulsion. To prevent premature polymerization, the emulsion is sparged with nitrogen in a nylon bag immersed in an ice-water bath. The sparged emulsion is then added to a 1.5 liter resin kettle immersed in a constant temperature water bath. The kettle was equipped with a stainless steel half-moon stirrer (normally operated at about 360 r.p.m.), nitrogen inlet, and a thermistor probe.

The polymerization is carried out at a bath temperature of 50° C. for 5 hours. A sodium acrylate/acrylamide copolymer is produced having an RSV of 29.2. The conversion from monomer to polymer is 97.8%.

In general, percent conversion of monomer to polymer and RSV are inversely proportional, i.e., as percent conversion increases RSV decreases. This relationship between percent conversion and RSV is illustrated in Table B below wherein the results of several polymerizations are shown. The polymerizations are conducted in accordance with the procedure described in Example 1 with the exception that the initiator, initiator concentration and/or reaction temperature are varied as indicated in Table B.

TABLE B

| Polymerization No.[1] | Bath Temp. | Initiator (ppm)[2] | Polymerization Time | Conversion Monomer to Polymer | RSV |
|---|---|---|---|---|---|
| 1 | 50° C. | ACVA, 400 | 3 hrs. | 93.9% | 31.7 |
| 2 | 50° C. | ACVA, 400 | 4 hrs. | 92.9% | 31.6 |
| 3 | 50° C. | ACVA, 400 | 5 hrs. | 97.8% | 29.2 |
| 4 | 30° C. | ACVA, 2500 | 3 hrs. | 86.4% | 37.3 |
| 5 | 30° C. | ACVA, 2500 | 5 hrs. | 98.0% | 35.1 |
| 6a | 30° C. | ADVN, 400 | 1 hr. | 69.6% | 43.1 |
| 6b | 30° C. | ADVN, 400 | 2 hrs. | 86.8% | — |
| 6c | 30° C. | ADVN, 400 | 3 hrs. | 91.9% | 38.6 |
| 6d | 30° C. | ADVN, 400 | 4 hrs. | 93.9% | 37.5 |
| 6e | 30° C. | ADVN, 400 | 5 hrs. | 94.9% | 37.4 |

[1] Polymerizations 1–5 are separate polymerizations. Polymerizations 6a–6e is a single polymerization sampled hourly.
[2] Based on the weight of monomers.

EXAMPLES 2–29

The following examples illustrate the effect of NaCl on the RSV of polymers produced in accordance with the process of this invention. The emulsions are prepared from the same ingredients and in the same manner as Example 1, except that the chemical initiator type and amount, temperature and amount of NaCl are varied as indicated in Table 1 below.

TABLE 1

| Ex. No. | Bath Temp., Time | Initiator (ppm)[a] | % NaCl[d] | Conversion - Monomer to Polymer | RSV |
|---|---|---|---|---|---|
| 2 | 50° C., 5 hrs. | ACVA, 400 | 8 | 97.8% | 29.2 |
| 3 | 50° C., 5 hrs. | ACVA, 160 | 8 | 93.8% | 30.1 |
| 4 | 50° C., 5 hrs. | ADVN, 80 | 8 | 96.7% | 26.8 |
| 5 | 50° C., 5 hrs. | $K_2S_2O_8$, 24 | 8 | 94.7% | 30.2 |
| 6 | 50° C., 5 hrs. | $KBrO_3$, 100/ $NaHSO_3$, 40[b] | 8 | 97.8% | 30.9 |
| 7 | 50° C., 5 hrs. | AIBN, 100 | 8 | 96.9% | 28.9 |
| 8 | 50° C., 5 hrs. | AIBN, 160 | 8 | 97.6% | 29.1 |
| 9 | 50° C., 5 hrs. | AIBN, 400 | 8 | 96.4% | 27.5 |
| 10 | 50° C., 5 hrs. | AIBN, 500 | 8 | 99.2% | 26.9 |
| 11 | 50° C., 5 hrs. | AIBN, 600 | 8 | 97.1% | 22.4 |
| 12 | 50° C., 5 hrs. | ACVA, 400 | 0 | 88.0% | 24.4 |
| 13 | 50° C., 5 hrs. | AIBN, 600 | 0 | 96.2% | 22.7 |
| 14 | 30° C., 5 hrs. | ACVA, 2500 | 8 | 98% | 35.1 |
| 15 | 30° C., 5 hrs. | ADVN, 400 | 8 | 94.9% | 37.4 |
| 16 | 30° C., 5 hrs. | ADVN, 500 | 8 | 96.0% | 38.5 |
| 17 | 30° C., 5 hrs. | ADVN, 500 | 8 | 96.4% | 38.0 |
| 18 | 30° C., 5 hrs. | ADVN, 500 | 4 | 96.9% | 35.7 |
| 19 | 30° C., 5 hrs. | AIBN, 2500 | 8 | 96.2% | 37.8 |
| 20 | 30° C., 5 hrs. | $KBrO_3$, 100/ $NaHSO_3$, 40[b] | 8 | 98.5% | 38.0 |
| 21 | 30° C., 5 hrs. | $NaHSO_3$, 100/ | 8 | 96.2% | 34.9 |

TABLE 1-continued

| Ex. No. | Bath Temp., Time | Initiator (ppm)[a] | % NaCl[d] | Conversion - Monomer to Polymer | RSV |
|---|---|---|---|---|---|
| 22 | 30° C., 5 hrs. | TBHP, 20[b][c] K$_2$S$_2$O$_8$, 20/ NaHSO$_3$, 8[b] | 8 | 97.4% | 32.3 |
| 23 | 30° C., 5 hrs. | ADVN, 500 | 0 | 86% | 33.5 |
| 24 | 30° C., 5 hrs. | ADVN, 640 | 0 | 95% | 31.9 |
| 25 | 30° C., 5 hrs. | ACVA, 2500 | 0 | 83% | 34.2 |
| 26 | 30° C., 5 hrs. | ACVA, 3000 | 0 | 93.0% | 33.5 |
| 27 | 30° C., 5 hrs. | ACVA, 3200 | 0 | 90.5% | 29.6 |
| 28 | 30° C., 5 hrs. | ACVA, 3600 | 0 | 89% | 33.3 |
| 29 | 30° C., 5 hrs. | ACVA, 3700 | 0 | 89.3% | 33.3 |

[a]Based on the weight of the monomers.
[b]The first component of the redox system is dissolved in the aqueous phase prior to emulsification. The second component is added during polymerization in ten equal increments, equally spaced over the duration of the polymerization.
[c]TBHP is t-butyl hydroperoxide.
[d]Based on the total weight of the emulsion.

The data in Table 1 illustrate that the presence of NaCl in the emulsion during polymerization significantly increases the RSV of the polymers produced at similar levels of conversion of monomer to polymer while at the same time increasing the rate of conversion from monomer to polymer. For instance, comparison of Examples 2 and 12 shows that under the same polymerization conditions both percent conversion and RSV are increased dramatically (from 88% to 97.8% and from 24.4 to 29.2 respectively) when NaCl is present in the emulsion.

Comparison of the results of the other examples in which polymerization conditions are identical, except for the presence of NaCl, e.g., Examples 16–18 and 23, and 14 and 25, further illustrates this improvement in percent conversion and RSV. This increase in both percent conversion and RSV is particularly surprising in view of the inversely proportional relationship between percent conversion and RSV illustrated previously in Table B.

EXAMPLE 30

The following example illustrates the effect of LiBr on the RSV of polymers produced in accordance with the process of this invention. The emulsions are prepared from the same ingredients and in the same manner as Example 1, except that LiBr is used instead of NaCl, and the amount of initiator and reaction temperature are varied as indicated in Table 2 below.

TABLE 2

| Ex. No. | Bath Temp., Time | Initiator[a] (ppm) | % LiBr[b] | Conversion - Monomer to Polymer | RSV |
|---|---|---|---|---|---|
| 30 | 30° C., 5 hrs. | ACVA, 2500 | 10 | 96% | 35.7 |

[a]Based on the weight of the monomers.
[b]Based on the total weight of the emulsion.

Comparison of the data in Table 2 with that of Examples 23–29 of Table 1, and particularly Example 25 wherein reaction conditions are the same as in this example except for the presence of LiBr in the emulsion, illustrates the significant increase in RSV while achieving a high percent conversion which occurs when LiBr is present in the emulsion prior to polymerization.

COMPARATIVE EXAMPLES I–IV

The following comparative examples illustrate that water-soluble salts such as KCl and Na$_2$SO$_4$ have no measurable effect on the RSV of polymers produced in accordance with the process of this invention. The emulsions are prepared from the same ingredients and in the same manner as Example 1, except that KCl and Na$_2$SO$_4$ are used instead of NaCl or LiBr and the initiator type and concentration, and reaction temperature are varied as indicated in Table I below.

TABLE I

| Ex. No. | Bath Temp., Time | Initiator[a] (ppm) | % KCl[b] | % Na$_2$SO$_4$[b] | Conversion - Monomer to Polymer | RSV |
|---|---|---|---|---|---|---|
| I | 30° C., 5 hrs. | ADVN, 500 | 8 | — | 96% | 32.8 |
| II | 30° C., 5 hrs. | ACVA, 2500 | 8 | — | 96% | 32.1 |
| III | 30° C., 5 hrs. | ADVN, 500 | — | 2 | 94% | 27.2 |
| IV | 30° C., 5 hrs. | ACVA, 2500 | — | 2 | 95% | 30.8 |

[a]Based on the weight of the monomers.
[b]Based on total emulsion.

Comparison of the data in Table I with the data for Examples 23–29 in Table 1 incidates that the presence of KCl and Na$_2$SO$_4$ in the emulsions prior to polymerization does not produce a significant increase in polymer RSV at a high percent conversion.

EXAMPLES 31–37

The following examples illustrate the effect of lowering the polymerization temperature on the RSV of polymers produced in accordance with the process of this invention. The emulsions are prepared from the same ingredients and in the same manner as Example 1, except that the chemical initiator type and amount and polymerization temperature are varied as indicated in Table 3 below. The amount of chemical initiator employed is increased as the polymerization temperature is lowered in order to maintain essentially equivalent polymerization rates and percent conversion of monomer to polymer at all temperatures. The data in parentheses is taken from previous examples.

TABLE 3

| Example No. | Bath Temp., Time | Initiator (ppm)[a] | Conversion - Monomer to Polymer | RSV |
|---|---|---|---|---|
| (2) | (50° C., 5 hrs.) | (ACVA, 400) | (97.8%) | (29.2) |
| (3) | (50° C., 5 hrs.) | (ACVA, 160) | (93.8%) | (30.1) |
| (4) | (50° C., 5 hrs.) | (ADVN, 80) | (96.7%) | (26.8) |
| (5) | (50° C., 5 hrs.) | (K$_2$S$_2$O$_8$, 24) | (94.7%) | (30.2) |
| (6) | (50° C., 5 hrs.) | (KBrO$_3$, 100/ NaHSO$_3$, 40)[b] | (97.8%) | (30.9) |
| (7) | (50° C., 5 hrs.) | (AIBN, 100) | (96.9%) | (28.9) |
| (8) | (50° C., 5 hrs.) | (AIBN, 160) | (97.6%) | (29.1) |
| (9) | (50° C., 5 hrs.) | (AIBN, 400) | (96.4%) | (27.5) |
| (10) | (50° C., 5 hrs.) | (AIBN, 500) | (99.2%) | (26.9) |
| (11) | (50° C., 5 hrs.) | (AIBN, 600) | (97.1%) | (22.4) |
| 31 | 40° C., 5 hrs. | ACVA, 1000 | 98.5% | 33.5 |
| 32 | 40° C., 5 hrs. | ADVN, 200 | 98.3% | 34.5 |
| 33 | 40° C., 5 hrs. | AIBN, 1000 | 98.1% | 32.1 |
| 34 | 40° C., 3 hrs. | KBrO$_3$, 100/ NaHSO$_3$, 40[b] | 93.2% | 32.8 |
| (14) | (30° C., 5 hrs.) | (ACVA, 2500) | (98%) | (35.1) |
| (15) | (30° C., 5 hrs.) | (ADVN, 400) | (94.9%) | (37.4) |
| (16) | (30° C., 5 hrs.) | (ADVN, 500) | (96.0%) | (38.5) |
| (17) | (30° C., 5 hrs.) | (ADVN, 500) | (96.4%) | (38.0) |
| (18)[d] | (30° C., 5 hrs.) | (ADVN, 500) | (96.9%) | (35.7) |
| (19) | (30° C., 5 hrs.) | (AIBN, 2500) | (96.2%) | (37.8) |
| (20) | (30° C., 5 hrs.) | (KBrO$_3$, 100/ NaHSO$_3$, 40)[b] | (98.5%) | (38.0) |
| (21) | (30° C., 5 hrs.) | (NaHSO$_3$, 100/ TBHP, 20)[b][c] | (96.2%) | (34.9) |
| (22) | (30° C., 5 hrs.) | (K$_2$S$_2$O$_8$, 20/ NaHSO$_3$, 8)[b] | (97.4%) | (32.3) |

TABLE 3-continued

| Example No. | Bath Temp., Time | Initiator (ppm)[a] | Conversion - Monomer to Polymer | RSV |
|---|---|---|---|---|
| 35 | 20° C., 5 hrs. | ADVN, 1332 | 97% | 40.1 |
| 36 | 20° C., 5 hrs. | ADVN, 2000 | 98% | 38.2 |
| 37 | 20° C., 6 hrs. | ACVA, 8000 | 98% | 38.0 |

[a]Based on the weight of the monomers.
[b]The first component of the redox system is dissolved in the aqueous phase prior to emulsification. The second component is added during the polymerization in ten equal increments, equally spaced over the course of the polymerization.
[c]TBHP is t-butyl hydroperoxide.
[d]4% NaCl, based on total emulsion, is used instead of 8%.

Examples 7–11 are control examples and illustrate the decrease in polymer RSV that results from employing increased concentration of initiator at 50° C.

The data in Table 3 illustrates the increase in RSV achieved by lowering the polymerization temperature while at the same time maintaining essentially equivalent conversion of monomer to polymer. For example, the RSV of the polymers produced at 20° C. is in the range of 38–40 whereas the RSV of the polymers produced at 50° C. is about 22–31 with the percent conversion of monomer to polymer being essentially the same at both temperatures.

What I claim and desire to protect by Letters Patent is:

1. In a chemically initiated water-in-oil emulsion polymerization process for making water-soluble anionic copolymers from at least two water-soluble, ethylenically unsaturated, addition polymerizable monomers, at least one of which is anionic, the improvement comprising: adding a salt selected from the group consisting of NaCl, NaBr, LiCl and LiBr to the aqueous phase of the water-in-oil emulsion prior to polymerization, and dispersing the aqueous phase and oil phase whereby the droplet size of the aqueous phase in the resulting emulsion is about 5 microns or less.

2. The process of claim 1 wherein the improvement further comprises maintaining the temperature of the water-in-oil emulsion below about 40° C. during polymerization.

3. The process of claim 1 or 2 wherein the water-soluble, ethylenically unsaturated, addition polymerizable monomers are sodium acrylate and acrylamide.

4. The process of claim 1 or 2 wherein the salt is NaCl.

5. The process of claim 2 wherein the water-soluble, ethylenically unsaturated, addition polymerizable monomers are sodium acrylate and acrylamide and the salt is NaCl.

6. In a chemically initiated water-in-oil emulsion polymerization process for making water-soluble anionic copolymers from at least two water-soluble, ethylenically unsaturated, addition polymerizable monomers, at least one of which is an anionic monomer selected from the group consisting of (a) monomers conforming to the formula

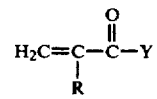

wherein R represents hydrogen or methyl, Y represents —NH$_2$, —OM, or

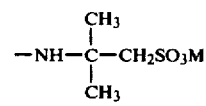

and wherein M is hydrogen, H$_4$N$^+$, alkali metal, or a cation yielding a water-soluble polymerizable compound, (b) vinyl sulfonic acid, (c) alkali metal salts of vinyl sulfonic acid, (d) diacetone acrylamide, and (e) mixtures thereof, the improvement comprising adding to the emulsion prior to polymerization a water-soluble salt selected from the group consisting of NaCl, NaBr, LiCl, and LiBr, said salt comprising from about 2% by weight, based on the weight of the total emulsion, up to the saturation level of the salt in the aqueous phase of the emulsion at the temperature of polymerization, and the droplet size of the aqueous phase in the emulsion being about 5 microns or less.

7. The process of claim 6 wherein the improvement further comprises maintaining the temperature of the water-in-oil emulsion below about 40° C. during polymerization.

8. The process of claims 6 or 7 in which aqueous phase comprises from about 70% to about 75% by weight and the oil phase comprises from about 30% to about 25% by weight, based on the weight of the water-in-oil emulsion and the salt is sodium chloride.

9. The process of claim 6 in which the droplet size of the aqueous phase in the emulsion is about one micron or less.

10. The process of claim 9 wherein the improvement further comprises maintaining the temperature of the water-in-oil emulsion below about 40° C. during polymerization.

* * * * *